(12) United States Patent
Li et al.

(10) Patent No.: US 11,008,473 B2
(45) Date of Patent: May 18, 2021

(54) LAYERED SILICATE/POLYMER COMPOSITE AND A METHOD OF FORMING THE SAME

(71) Applicant: Agency for Science, Technology and Research, Singapore (SG)

(72) Inventors: Xu Li, Singapore (SG); Chaobin He, Singapore (SG); Siew Yee Wong, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 0 days.

(21) Appl. No.: 16/853,675

(22) Filed: Apr. 20, 2020

(65) Prior Publication Data

US 2020/0248010 A1    Aug. 6, 2020

Related U.S. Application Data

(62) Division of application No. 14/350,057, filed as application No. PCT/SG2012/000372 on Oct. 4, 2012, now Pat. No. 10,647,860.

(30) Foreign Application Priority Data

Oct. 6, 2011  (SG) ................ 201107292-3

(51) Int. Cl.
    *C09D 7/61*    (2018.01)
    *C08K 9/08*    (2006.01)
    (Continued)

(52) U.S. Cl.
    CPC ............. *C09D 7/61* (2018.01); *B82Y 40/00* (2013.01); *C08K 3/346* (2013.01); *C08K 9/08* (2013.01);
    (Continued)

(58) Field of Classification Search
    CPC ... C09D 7/61; C09D 1/00; C09D 1/04; B82Y 40/00; C08K 3/346; C08K 9/08; Y10T 428/249921
    See application file for complete search history.

(56) References Cited

U.S. PATENT DOCUMENTS 3,328,226 A     6/1967 Wiley
2005/0282948 A1  12/2005 Li et al.
(Continued)

FOREIGN PATENT DOCUMENTS

WO    2009041870 A1   4/2009

OTHER PUBLICATIONS

Chen, et al., "Effect of Polymerically-Modified Clay Structure on Morphology and Properties of UV-Cured EA/Clay Nanocomposites," Journal of Applied Polymer Science, 2010, pp. 1278-1283, vol. 116, Wiley Periodicals, Inc.
(Continued)

*Primary Examiner* — Robert S Walters, Jr.
(74) *Attorney, Agent, or Firm* — Womble Bond Dickinson (US) LLP

(57) ABSTRACT

The present invention relates to a method for forming a layered silicate/polymer composite, the composite comprising individual exfoliated silicate layers separated in a continuous polymer matrix, wherein the polymer is a hydrophobic polymer, the method comprising: exfoliating sheet silicate in water to form a silicate suspension; replacing the water in the silicate suspension by an organic solvent to form a silicate/organic solvent suspension; contacting the silicate/organic solvent suspension with a solution of a hydrophobic polymer precursor in an organic solvent to form a silicate/polymer precursor suspension; coating the silicate/polymer precursor suspension on a substrate; removing the organic solvents; curing the hydrophobic polymer precursor of the
(Continued)

coating of the silicate/polymer precursor; and annealing the cured coating to form the layered silicate/polymer composite on the substrate.

3 Claims, 4 Drawing Sheets

(51) Int. Cl.
    *C09D 1/04*     (2006.01)
    *B82Y 40/00*     (2011.01)
    *C09D 1/00*     (2006.01)
    *C08K 3/34*     (2006.01)

(52) U.S. Cl.
    CPC ................. *C09D 1/00* (2013.01); *C09D 1/04* (2013.01); *Y10T 428/249921* (2015.04)

(56) References Cited

U.S. PATENT DOCUMENTS

2010/0196611 A1     8/2010     Phonthammachai et al.
2014/0377545 A1    12/2014    Karvitz et al.

OTHER PUBLICATIONS

Fornes, et al., "Formation and Properties of Nylon 6 Nanocomposites," Polimeros: Ciencia e Tecnologia, 2003, pp. 212-217, vol. 13, No. 4, Artigo Tecnico Cientifico.

The International Preliminary Report on Patentability for PCT Application No. PCT/SG2012/000372 dated Jan. 22, 2014, 17 pages.
The International Search Report for PCT Application No. PCT/SG2012/000372 dated Nov. 27, 2012, 4 pages.
The Written Opinion of the International Searching Authority for PCT Application No. PCT/SG2012/000372 dated Nov. 27, 2012, 4 pages.
Podsiadlo, et al., "Ultrastrong and Stiff Layered Polymer Nanocomposites," Science, 2017, 5 pgs., vol. 318, No. 80, American Association for the Advancement of Science.
Tetsuka, et al., "Highly transparent flexible clay films modified with organic polymer: structural characterization and intercalation properties," Journal of Materials Chemistry, 2007, pp. 3545-3550, vol. 17, The Royal Society of Chemistry 2007.
The Final Office Action for U.S. Appl. No. 14/350,057 dated Aug. 21, 2017, 7 pages.
The Final Office Action for U.S. Appl. No. 14/350,057 dated Oct. 3, 2018, 10 pages.
The Notice of Allowance for U.S. Appl. No. 14/350,057 dated Jan. 8, 2020, 8 pages.
The Corrected Notice of Allowability for U.S. Appl. No. 14/350,057 dated Feb. 24, 2020, 6 pages.
The Non-Final Office Action for U.S. Appl. No. 14/350,057 dated Feb. 22, 2017, 10 pages.
The Non-Final Office Action for U.S. Appl. No. 14/350,057 dated Mar. 21, 2019, 5 pages.
The Non-Final Office Action for U.S. Appl. No. 14/350,057 dated Dec. 6, 2017, 10 pages.
The Restriction Requirement for U.S. Appl. No. 14/350,057 dated Jul. 20, 2016, 8 pages.
Joshi et al., "Polymer/clay nanocomposite based coatings for enhanced gas barrier property", Indian Journal of Fibre & Textile Research, vol. 31, Mar. 2006, pp. 202-214.

LAYERED SILICATE/POLYMER COMPOSITE AND A METHOD OF FORMING THE SAME

CROSS-REFERENCE TO RELATED APPLICATIONS

This patent application is a divisional of U.S. application Ser. No. 14/350,057, filed Apr. 4, 2014, which is a National Phase application under 35 U.S.C. § 371 of International Application No. PCT/SG2012/000372, filed Oct. 4, 2012, entitled A LAYERED SILICATE/POLYMER COMPOSITE AND A METHOD OF FORMING THE SAME, which claims the benefit of priority of Singapore patent application No. 201107292-3, filed Oct. 6, 2011, the contents of which were incorporated by reference in their entirety for all purposes.

TECHNICAL FIELD

The present invention relates to layered silicates/polymer composites and methods of forming layered silicates/polymer composites.

BACKGROUND

Presently, the application of plastic films as protective films in electronics is hampered by the softness of the plastic films. Plastic films are easily scratched and may not provide sufficient protection for the electronic device. In addition, existing coatings for plastic films have poor stretching toughness. The poor stretching toughness leads to whitening during forming of coated plastic films. This leads to high wastage during the manufacturing process. Furthermore, hard coatings should ideally only be hardened during the forming process. However, in conventional processes of forming coated plastic films, the coatings typically harden before the forming process. Consequently, the coating may not stick as well to the plastic films.

Therefore, there is a need to address and improve on at least some of the abovementioned deficiencies of existing coatings for plastic films.

SUMMARY OF THE INVENTION

In a first aspect, the present invention refers to a method for forming a layered silicate/polymer composite, the composite comprising individual exfoliated silicate layers separated in a continuous polymer matrix, wherein the polymer is a hydrophobic polymer, the method comprising: exfoliating sheet silicate in water to form a silicate suspension; replacing the water in the silicate suspension by an organic solvent to form a silicate/organic solvent suspension; contacting the silicate/organic solvent suspension with a solution of a hydrophobic polymer precursor in an organic solvent to form a silicate/polymer precursor suspension; coating the silicate/polymer precursor suspension on a substrate; removing the organic solvents; curing the hydrophobic polymer precursor of the coating of the silicate/polymer precursor; and annealing the cured coating to form the layered silicate/polymer composite on the substrate.

In a second aspect, the present invention relates to a layered silicate/polymer composite comprising individual exfoliated silicate layers separated in a continuous polymer matrix, wherein the silicate content is less than or equal to 10 wt % (based on the total weight of the composite) and the scratch resistance of the composite is at least 1H measured in terms of pencil hardness in a pencil scratch test using a Pencil Hardness Tester.

BRIEF DESCRIPTION OF THE DRAWINGS

The invention will be better understood with reference to the detailed description when considered in conjunction with the non-limiting examples and the accompanying drawings, in which.

DETAILED DESCRIPTION OF THE INVENTION

In a first aspect, the present invention refers to a method for forming a layered silicate/polymer composite, whereby the composite comprises individual exfoliated silicate layers separated in a continuous polymer matrix, and the polymer is a hydrophobic polymer. The method comprises exfoliating sheet silicate in water to form a silicate suspension, replacing the water in the silicate suspension by an organic solvent to form a silicate/organic solvent suspension, contacting the silicate/organic solvent suspension with a solution of a hydrophobic polymer precursor in an organic solvent to form a silicate/polymer precursor suspension, coating the silicate/polymer precursor suspension on a substrate, removing the organic solvents, curing the hydrophobic polymer precursor of the coating of the silicate/polymer precursor, and annealing the cured coating to form the layered silicate/polymer composite on the substrate.

In the present context, "layered silicate/polymer composites" are also known as polymer-layered silicate nanocomposites (PLSNs). They generally refer to (nano) composite hybrids composed of layer silicates or sheet silicates (also called phyllosilicates) dispersed in a polymer matrix in the form of reticular layers of crystals. Such composites are commonly termed as exfoliated composites and are to be distinguished from intercalated composites. In an exfoliated composite, the individual silicate layers are separated in the polymer matrix by average distances that depend on the silicate loading only. Usually, the silicate loading in an exfoliated composite is much lower than that of an intercalated composite. For example, the silicate loading an exfoliated composite may be less than or equal to 20 wt % based on the total weight of the composite, such as 20 wt %, or 18 wt %, or 16 wt %, or 14 wt %, or 12 wt %, or 10 wt %, or 8 wt %, or 6 wt % or less.

Accordingly, "individual exfoliated silicate layers separated in a continuous polymer matrix" means that the silicate layers may be uniformly dispersed in the continuous polymer matrix and the number of polymer chains in the polymer matrix between the silicate layers is variable between different silicate layers.

Figure 1:
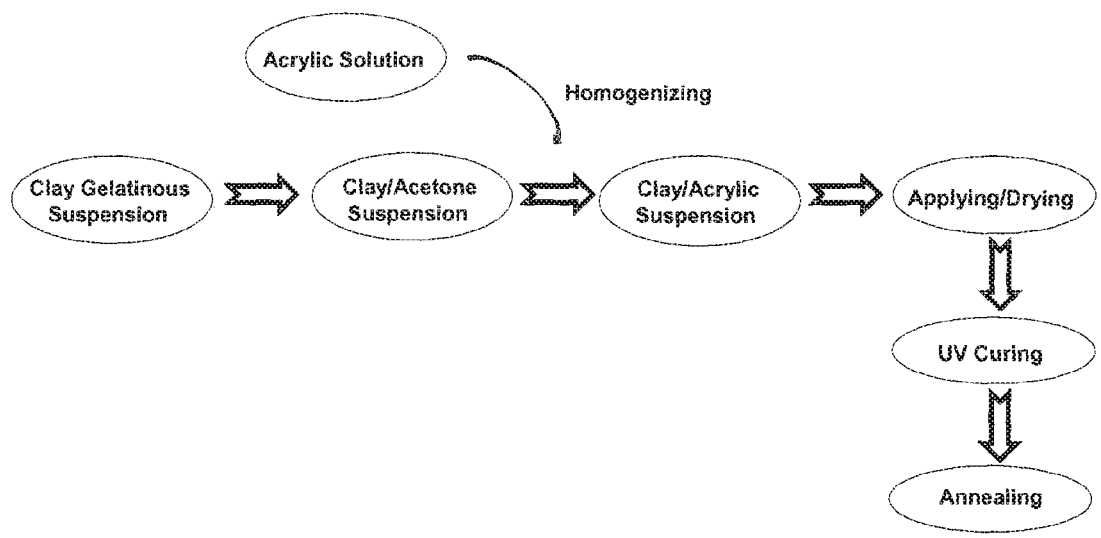
FIG. 1 is a schematic diagram depicting the preparation of a hard coating according to one embodiment of the present invention.

FIG. 1 illustrates the preparation of a hard coating according to one embodiment of the present invention. Sheet silicates or layered silicates (also known as clay) are hydrophilic and may be exfoliated in water to form a silicate suspension, in which the sheet silicates are dispersed in water layer by layer starting with the outermost layer and moving to the innermost layer of the sheet silicate to form a suspension of isolated sheets or small domains consisting of a few sheets. However, sheet silicates cannot be exfoliated in non-polar organic solvent and dispersed into hydrophobic polymer matrix uniformly.

In one embodiment, the process of exfoliating silicate in water may include dispersing the silicate in water under magnetic stirring, and using high speed homogenization to obtain the gelatinous silicate suspension. To facilitate exfoliation of silicate in water, the water may be acidified. In one embodiment, water can be acidified with acetic acid. Other non-limiting examples of substances that can be used to acidify water include citric acid or glycine acid.

The silicates used are layered silicates (also called phyllosilicate). The layered silicate or phyllosilicate may be selected from the group consisting of the serpentine group of phyllosilicates, the clay mineral group of phyllosilicates, the mica group of phyllosilicates, the chlorite group of phyllosilicates, and a mixture thereof. The phyllosilicate may be selected from the group consisting of montomorillonite, kaolinite, antigorite, chrysotile, lizardite, halloysite, illite, vermiculite, talc, palygorskite, pyrophyllite, biotite, muscovite, phlogopite, lepidolite, margarite, glauconite, chlorite, and a mixture thereof. In a preferred embodiment, silicates with aspect ratio of 10 and above are used. In one embodiment, montomorillonite is exfoliated in water to form the silicate suspension.

After exfoliating the sheet silicate in water, the water in the silicate suspension is replaced by an organic solvent to form a silicate/organic solvent suspension through a process such as solvent exchange. The step of replacing water by an organic solvent may be carried out by adding the organic solvent to the silicate suspension in water, filtering the resulting suspension and re-suspending the silicate in the organic solvent. The cycle of adding the organic solvent, filtering and re-suspending may be repeated at least once.

Solvent exchange may be further repeated for one or more times in order to improve the dispersion of layered silicate in the hydrophobic polymer matrix in subsequent processing steps. For example, the solvent exchange may be repeated once, or twice, or thrice, or more. In one embodiment, solvent exchange is carried out a total of two times. However, excessive solvent exchange may lead to coagulation of exfoliated silicate sheets and subsequently, poor silicate dispersion in the polymer matrix. It is to be appreciated and understood that the solvent exchange is carried out until a substantial proportion of water, but not entirely, has been replaced by the organic solvent. For example, at least 50% of the water has been replaced by the organic solvent, such as about 50%, about 55%, about 60%, about 65%, about 70%, about 75%, about 80%, about 85%, about 90%, about 95% or more. In a preferred embodiment, about or more than 95% of the water has been replaced by the solvent.

In various embodiments, the organic solvent used in the solvent exchange for forming a silicate/organic solvent suspension is a ketone. Advantageously, the organic solvent selected for the solvent exchange step may be miscible with a further organic solvent for the hydrophobic polymer or the precursor thereof. In one embodiment, the organic solvent is acetone. In other embodiments, the organic solvent can be other ketones such as 2-Butanone or methyl ethyl ketone, or tetrahydrofuran.

The silicate/organic solvent suspension may then be concentrated using filtration and/or evaporation. Evaporation may be carried out using rotary evaporation. In various embodiments, the final concentration of silicate in organic solvent may vary from 3 to 10 weight percentage (wt %) change, or from 5 to 8 weight percentage (wt %) change or from 6 to 7 weight percentage (wt %) change. The weight percentage change is calculated by measuring weight change of a part of suspension before and after completed drying.

The silicate/organic solvent suspension is then contacted with a solution of a hydrophobic polymer precursor in an organic solvent to form a silicate/polymer precursor suspension. Preferably, the organic solvent of the silicate/organic solvent suspension is miscible with the organic solvent of the polymer precursor solution. The polymer precursor may be cross-linkable with silicates. For example, the polymer precursor may contain hydroxyl or carboxylic acid groups for cross-linking with the silicates. Such cross-linking groups may be initiated by UV radiation or heating.

In various embodiments, the polymer precursor of the polymer precursor solution is selected from a group consisting of acrylates. Examples of acrylates may include methacrylates, ethylacrylates, n-butylacrylates, i-butylacrylates and isopropylacrylates. One exemplary embodiment of a polymer precursor of the polymer precursor solution is acrylate and the organic solvent of the silicate/organic solvent suspension is acetone. Alternatively, other non-limiting examples of organic solvents include other ketones such as 2-Butanone, methyl ethyl ketone, and tetrahydrofuran.

The organic solvent for the solvent exchange and the organic solvent for the polymer precursor solution may be the same or different. In a preferred embodiment, the organic solvent is acetone, the polymer precursor in the polymer precursor solution is acrylate, the organic solvent for the polymer precursor is a ketone such as methyl ethyl ketone (MEK) and the silicate/polymer precursor suspension is silicate/acrylate suspension. A reason for choosing acetone is because it is miscible with methyl ethyl ketone which is a common solvent for acrylate and acetone is readily available. One commercially available acrylate in methyl ethyl ketone (MEK) solution is TH88 (a trade-name from INNOX Co, Ltd).

The silicate/polymer precursor suspension may be obtained from the silicate/organic solvent suspension and the polymer precursor solution by mixing the silicate/organic solvent suspension and the polymer precursor solution, followed by stirring, water-bath sonication and/or high speed homogenization. Other methods of mixing may also be employed such as probe sonication.

The coating of the silicate/polymer precursor suspension on a substrate may then be performed by suitable coating techniques such as roll coating, bar coating and/or blade coating. Prior to the coating step, the exfoliated silicate sheets are randomly dispersed in the silicate/polymer precursor suspension. The step of coating the silicate/polymer precursor solution on a substrate may comprise applying a force such as a shearing force to the suspension to orient the randomly dispersed silicate sheets along the substrate-surface. At the same time, the polymer precursor may be sandwiched between silicate sheets to form a continuous phase. By applying a shear force during the coating step, the randomly dispersed exfoliated silicate sheets are now oriented and aligned along the substrate plane. The aligned orientation of the silicate sheets leads to improved scratching hardness in the perpendicular direction to the substrate plane. The scratching hardness may improve from at least 1H to about 2H and more, as illustrated in the examples below.

After forming the coating of the silicate/polymer precursor suspension on a substrate, the organic solvents in the suspension are removed, for example, by drying the coating in air. The drying is carried out at temperatures lower than the boiling point of the organic solvents. In various embodiments, the drying may be carried out at room temperature or elevated temperature such as 35° C., or 40° C., or 45° C., or 50° C.

After removal of the organic solvents from the silicate/polymer precursor suspension, the polymer precursor of the coating of the silicate/polymer precursor is cured and the cured coating subsequently annealed to obtain a layered silicate/polymer composite formed on the substrate.

In various embodiments, curing includes, but is not limited to, ultraviolet curing, thermal curing, electron beam curing or combinations thereof. In one embodiment, the polymer precursor of the coating of the silicate/polymer precursor is cured by UV radiation. As mentioned above, the curing serves to initiate the cross-linking process of the polymer precursor to the sheet silicates.

The substrate may comprise a plastic substrate. The plastic substrate may include substrate made of polyethylene terephthalate (PET) or polycarbonate (PC).

In various embodiments, annealing includes annealing at a temperature ranging from about 100 to about 200° C., such as about 140 to 160° C. Annealing helps in the formation of interfacial covalent bonds between the silicate sheets and the polymer matrix and leads to improved stretching toughness of the composite in the horizontal direction of the substrate plane, as described in more detail in the examples below. During the annealing, chemical bonding between the silicate sheet and the polymer matrix is formed through the condensation of cross-linking functional groups such as hydroxyl or carboxylic acid groups from the polymer precursor. The annealing step may in addition to improving the stretching toughness in the horizontal direction, improve the scratching hardness of the resultant composite in the perpendicular direction.

In a second aspect, the invention relates to a layered silicate/polymer composite comprising individual exfoliated silicate layers separated in a continuous polymer matrix, wherein the silicate content is less than or equal to 10 wt % (based on the total weight of the composite) and the scratch resistance of the composite is at least 1H measured in terms of pencil hardness in a pencil scratch test. The pencil scratch test may be carried out using a commercially available Pencil Hardness Tester.

In various embodiments, the silicate content may vary from 0.3 to 5 wt %, such as from 0.3 to 3 wt %, such as about 0.4 wt %. Preferably, the scratch resistance is at least 2H.

In one embodiment, the layered silicate/polymer composite comprises individual exfoliated montmorillonite layers separated in a continuous polyacrylate matrix, wherein the montmorillonite content is 0.4 wt % and the scratch resistance is at least 2H.

The layered silicate/polymer composite may be used as a coating for an electronic device or a packaging.

A coated electronic device or packaging may comprise a coating formed from the layered silicate/polymer composite.

In summary, the formation of interfacial covalent bonds caused by cross-linking the polymer matrix and silicate sheets leads to improved stretching toughness and scratching hardness. The greater the amount of cross-linking between acrylates and silicates, the greater the improvement in scratching hardness and stretching toughness.

The alignment in orientation of the silicate sheets along the substrate plane also results in improved scratching hardness.

Furthermore, the composite is hierarchically structured which also contributes to enhancement in both scratching hardness and stretching toughness. In the present context, "hierarchically structured" means that the silicate sheets are stacked together layer by layer and polymer chain are intercalated between two silicate layers.

In addition, the coating tends to harden only during or after it is applied to the substrate and not before that.

Other embodiments are within the following claims and non-limiting examples.

EXPERIMENTAL SECTION

Preparation of Coating and Application of Coating onto PET Film.

Step 1: Preparation of gelatinous exfoliated clay suspension. 2.0 g pristine clay is suspended in 75 g water ($H_2O$) under magnetic stirring. After stirring for 3 hours, 0.075 ml acetic acid is added and further stirred overnight. Then, the clay suspension is sonicated in water-bath sonicator for 30 minutes. Finally, the clay suspension is homogenized for 15 minutes at speed rate of 12,000 rpm using Homogenizer T18 to prepare gelatinous exfoliated clay suspension.

Step 2: Preparation of clay acetone suspension. The prepared gelatinous exfoliated clay suspension is added to 600 ml acetone, and is homogenized for 5 minutes at speed rate of 12,000 rpm. The homogenized clay suspension is then filtered using a filter paper. The collected clay paste is further suspended into another 600 ml acetone and homogenized for 5 minutes. After filtration, the clay/acetone suspension is prepared by suspending the collected clay paste in acetone with the total weight of 50 g. The clay concentration calculated is 0.04 wt %.

Step 3: Preparation of clay/acrylate coating suspension. 1.5 g of the above prepared clay acetone suspension is added into 49.8 g TH88 (acrylate coating solution in methyl ethyl ketone; 30 wt %). After vortex stirring for 5 minutes and followed by sonication for 2 minutes, homogenization is carried out for 2 minutes at speed rate of 12,000 rpm to prepare the clay/acrylate coating suspension. The concentration of clay in the final solid material is calculated as 0.4 wt %.

Step 4: Preparation of clay/acrylate hard coating layer onto PET film. The above prepared clay/acrylate coating suspension is applied onto PET substrate using bar applicator. The coating thickness is of 5 μm after air drying off the solvent at 80° C. The dried coating is then cured under UV radiation at intensity of 500 mJ/cm$^2$. The hard coated PET film is further annealed at 140~160° C. for 5 seconds before forming to avoid whitening.

Figure 2:
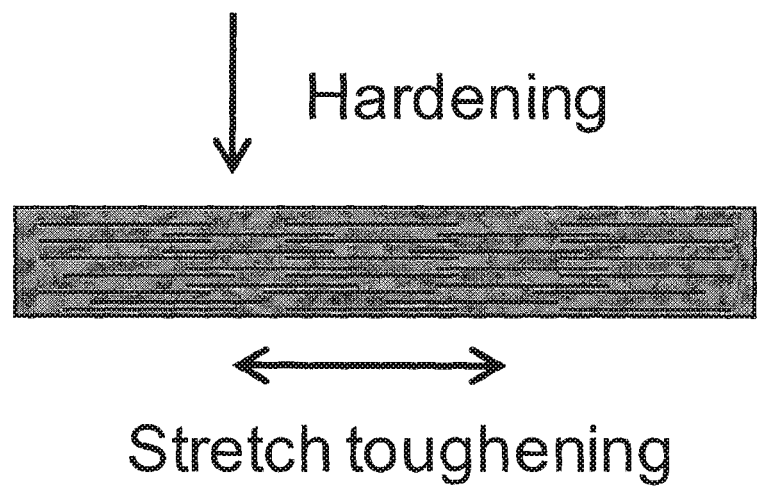
FIG. 2 is a schematic diagram illustrating a method to test the scratching hardness as well as a method stretching toughness of a hard coating layer prepared from applying silicate/acrylate suspension on a plastic substrate according to one embodiment of the present invention.

Characterization UV-visible transmission of the clay/TH88 composite coated PET film or TH88 coated PET film are measured using Shimadzu UV-3101 PC spectrometer at room temperature. SEM image of the surface of clay/TH88 composite layer is obtained using a field emission scanning electron microscope (SEM, JEOL JSM-6700F). The surface morphology of clay/TH88 composite layer is also observed using optical microscopy at magnification of 500 times. The scratch hardness of clay/TH88 composite coated onto PET film is measured using standard pencil. FIG. 2 illustrates a method to test the scratching hardness as well as a method to test the stretching toughness of a hard coating layer prepared from applying silicate/acrylate suspension on a plastic substrate.

Figure 3:
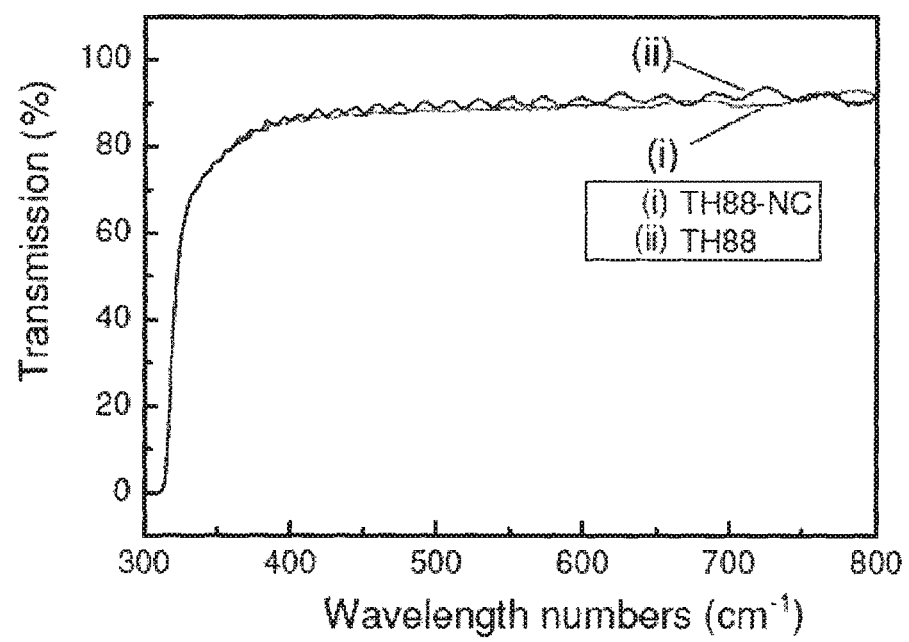
FIG. 3 is a graph showing the transmission spectra of (i) a clay/TH88 composite coated PET film and (ii) a pure TH88 coated PET film according to one embodiment of the present invention.

Light transparency is one of the basic requirements in the development of polymer composite coating for display applications. Light transmission of prepared silicate/polymer composite coated plastic films is tested by UV-visible spectroscopy. FIG. 3 shows the transmission spectra of the clay/TH88 composite coated PET film and pure TH88 coated PET film (light transmission in air is taken as a reference as 100%), which demonstrates the prepared composite coated PET film is transparent to visible light. Transparency to visible light is due to the orientation of clay sheets along the PET substrate plane.

The scratching hardness of clay/TH88 composite coated PET film various clay contents is measured by using standard pencil as listed in Table 1.

TABLE 1

| Samples | Coating thickness (μm) | Pencil hardness | Elongation | Pencil hardness after annealing |
|---|---|---|---|---|
| TH88 | 4~5 | H x | >100% | H x |
| TH88-Clay(4 wt %) | 4~5 | H o | >5% | H o |
|  |  | 2H Δ | Whitening | 2H o |
| TH88-Clay(2 wt %) | 4~5 | H o | >15% | H o |
|  |  | 2H x | Whitening | 2H o |
| TH88-Clay(1 wt %) | 4~5 | H o | >15% | H o |
|  |  | 2H x | Whitening | 2H o |
| TH88-Clay(1 wt %) | 2~3 | H x | >20% | H o |
|  |  |  | Whitening | 2H x |
| TH88-Clay(0.4 wt %) | 4~5 | H x | >50% | H o |
|  |  |  | Whitening | 2H o |
| TH88-Clay(0.4 wt %) | 2~3 | H x | >50% | H o |
|  |  |  | Whitening | 2H x | x: Failed;
Δ: Almost pass;
o: Pass

In order to study the effect of interfacial bonding between clay sheets and TH88 matrix on hardness improvement, clay/TH88 composite coated PET films are annealed at 150° C. for 10 minutes. The hardness of the annealed coated PET films are measured and listed in Table 1 also. As shown in Table 1, while the hardness of pure TH88 coated PET film is less than 1H, the hardness of clay/TH88 composite coated PET film increases from lower than 1H to 2H with clay content increasing from 0.5 to 4 wt %. Annealing could enhance the hardness further, which is due to the formation of interfacial bonding between clay and TH88. COOH or OH groups from acrylates could react with OH groups in condensation reactions on the surface of clay sheets leading to form covalent bonding. After annealing, the minimal clay content to achieve hardness of 2H is 0.4 wt %. At equal amounts (wt %) of clay, the hardness of clay/TH88 composite coated PET film increases with increasing thickness. As an example, at clay amount of 0.4 wt %, the hardness could be increased from less than 2H at thickness of 2~3 μm to more than 2H at thickness of 4~5 μm.

Figure 4:
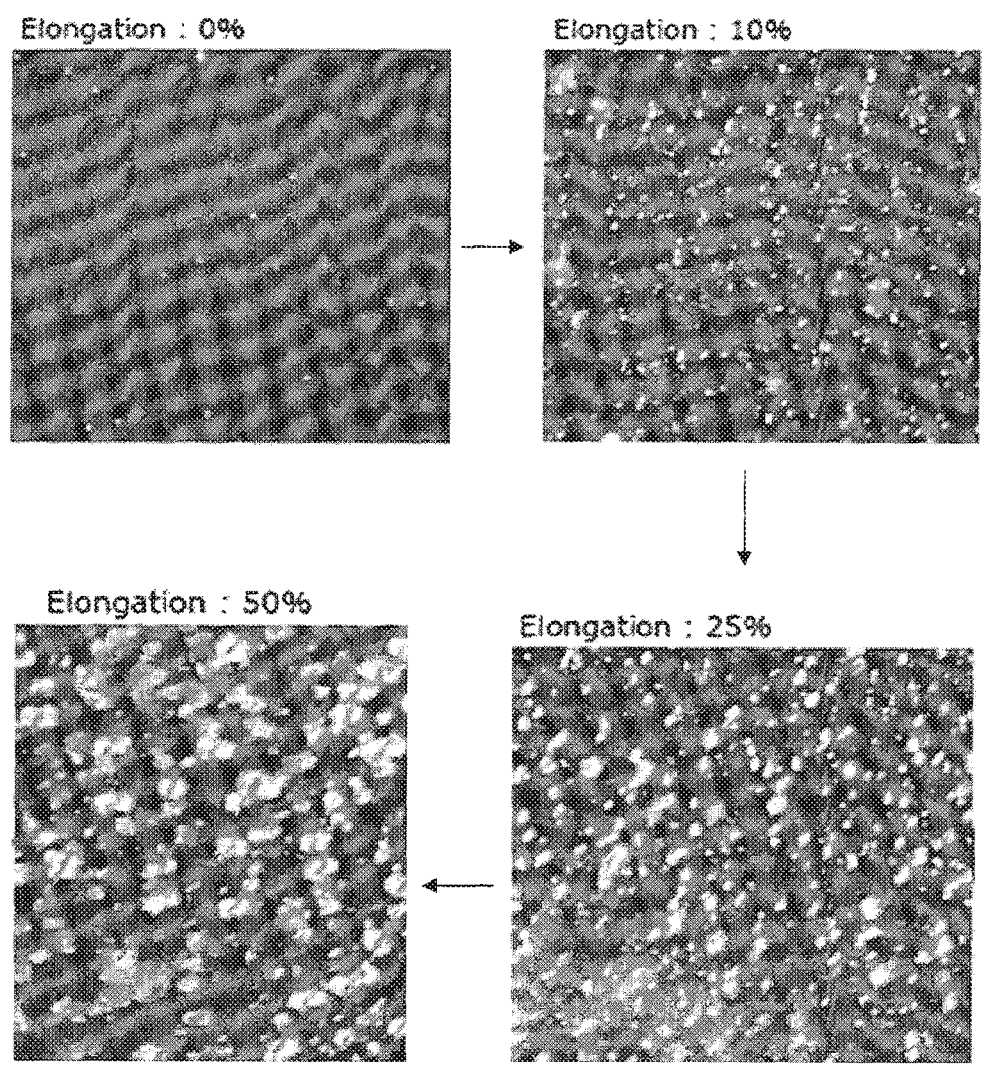
FIG. 4 are topological optical microscopy images at X 500 showing surface morphology of a clay/TH88 composite layer (clay: 0.4 wt %) without annealing at different elongation according to one embodiment of the present invention.

Stretching toughness is critical for plastic coating, especially for forming the coated film into various curvatures. A coating layer will crack if its stretching toughness is poor. As shown in FIG. 4, whitening is observed when the coated film is stretched, which is more serious at higher elongation. As listed in Table 1, elongation at which whitening is observed decreases from 50 to 5% with increasing clay content from 0.5 to 4 wt %.

Figure 5:
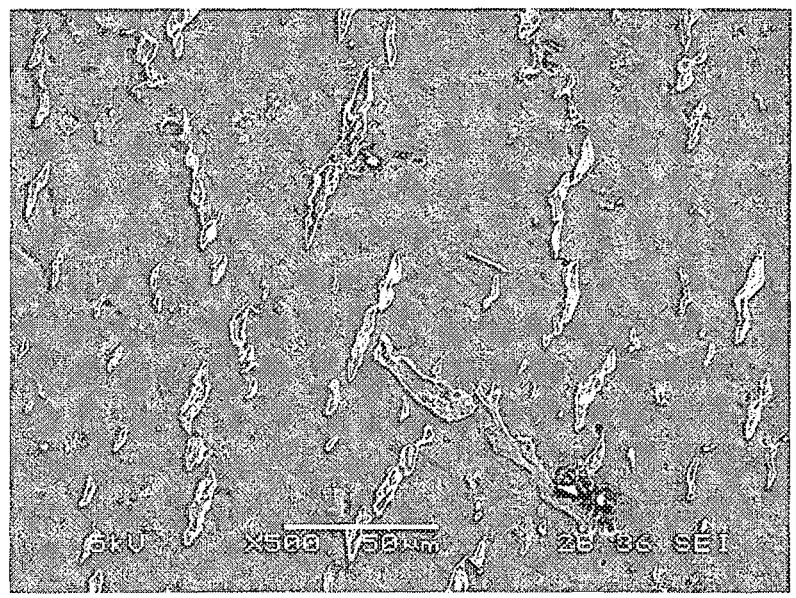
FIG. 5 is a topological scanning electron microscopy (SEA) image of a sample having an elongation of 100% according to one embodiment of the present invention.

Whitening is due to the weak interfacial bonding between clay sheets and polymer matrix which leads to cracks in the stacked clay domain. Such cracks could be observed clearly in the scanning electron microscopy (SEM) image of elongated sample as shown in FIG. 5. It is expected that increasing interfacial bonding between clay sheet and HT88 could reduce whitening. Therefore, to reduce whitening, the polymer composite coated samples are annealed at 140 to 160° C. for 5 seconds, leading to formation of covalent bonding between clay sheets and acrylate matrix due to condensation reaction betweens OH groups from clay surface and COOH or OH groups from acrylate.

Figure 6:
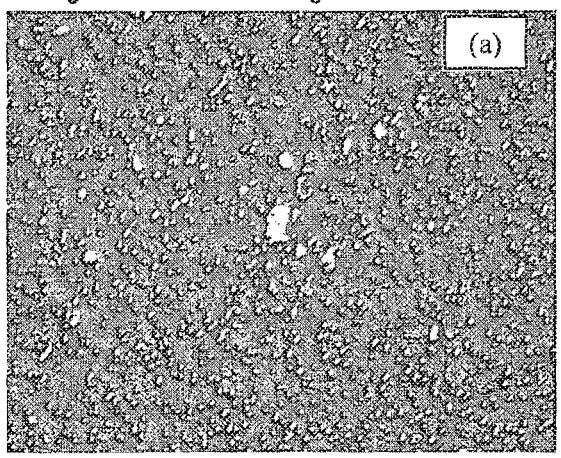
FIG. 6 is a topological optical microscopy image at X 500 showing surface morphology of a clay/TH88 composite layer (clay: 0.4 wt %) at 100% elongation (a) without annealing and (b) after annealing at 140-160° C.
Figure 6:
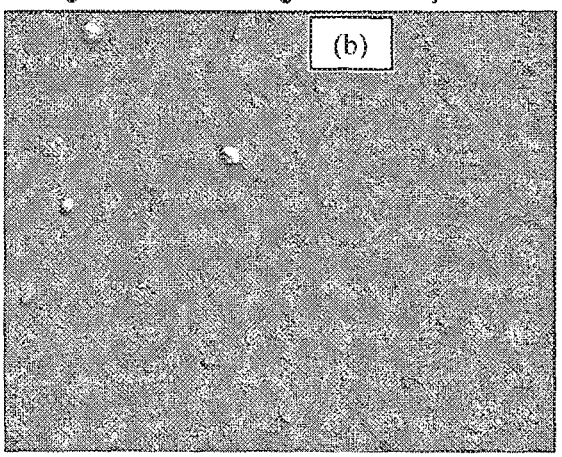

FIG. 6 shows the topological optical microscopy image of coated PET film with or without annealing at elongation of 100%. As shown in FIG. 6, no whitening is observed when the clay/TH88 composite coated film is stretched after annealing. In contrast, whitening is obviously observed when the composite coated PET film is stretched without annealing.

By "comprising" it is meant including, but not limited to, whatever follows the word "comprising". Thus, use of the term "comprising" indicates that the listed elements are required or mandatory, hut that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc, shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

What is claimed is:

1. A coating formed from a layered silicate/polymer composite comprising individual exfoliated silicate layers separated in a continuous polymer matrix, wherein the silicate content is less than or equal to 0.4 wt % (based on the total weight of the composite) and the scratch resistance of the composite is at least 2H measured in terms of pencil hardness in a pencil scratch test using a Pencil Hardness Tester; wherein the individual exfoliated silicate layers are oriented along a plane; wherein a thickness of the coating is of any value selected from 4 µm to 5 µm; and wherein the coating is formed by a method comprising:
exfoliating sheet silicate in water to form a silicate suspension;
replacing the water in the silicate suspension by a first organic solvent to form a silicate/organic solvent suspension;
carrying out rotary evaporation on the silicate/organic solvent suspension to form a concentrated silicate/organic solvent suspension;
contacting the concentrated silicate/organic solvent suspension with a solution of a hydrophobic polymer precursor in a second organic solvent to form a silicate/polymer precursor suspension, the silicate layers randomly dispersed in the silicate/polymer precursor suspension, the polymer precursor containing hydroxyl or carboxylic acid groups;
coating the silicate/polymer precursor suspension on a substrate comprising applying a shearing force to the suspension to orient the dispersed silicate layers along a surface of the substrate;
removing the first organic solvent and the second organic solvent;
curing the hydrophobic polymer precursor of the coating of the silicate/polymer precursor using ultraviolet radiation to initiate cross-linking of hydroxyl or carboxylic groups of the polymer precursor with the silicate layers; and
annealing the cured coating to form the layered silicate/polymer composite on the substrate, wherein the annealing forms chemical bonds between the silicate layers and the polymer matrix through cross-linking of the hydroxyl or carboxylic groups with the silicate layers.

2. The composite of claim 1, comprising individual exfoliated montmorillonite layers separated in a continuous polyacrylate matrix, wherein the montmorillonite content is 0.4 wt % and the scratch resistance is at least 2H.

3. A coated electronic device or packaging, comprising a coating formed from a layered silicate/polymer composite comprising individual exfoliated silicate layers separated in a continuous polymer matrix, wherein the silicate content is less than or equal to 0.4 wt % (based on the total weight of the composite) and the scratch resistance of the composite is at least 2H measured in terms of pencil hardness in a pencil scratch test using a Pencil Hardness Tester; wherein the individual exfoliated silicate layers are oriented along a plane; wherein a thickness of the coating is of any value selected from 4 µm to 5 µm; and wherein the coating is formed by a method comprising:
exfoliating sheet silicate in water to form a silicate suspension;
replacing the water in the silicate suspension by a first organic solvent to form a silicate/organic solvent suspension;
carrying out rotary evaporation on the silicate/organic solvent suspension to form a concentrated silicate/organic solvent suspension;
contacting the concentrated silicate/organic solvent suspension with a solution of a hydrophobic polymer precursor in a second organic solvent to form a silicate/polymer precursor suspension, the silicate layers randomly dispersed in the silicate/polymer precursor suspension, the polymer precursor containing hydroxyl or carboxylic acid groups;
coating the silicate/polymer precursor suspension on a substrate comprising applying a shearing force to the suspension to orient the dispersed silicate layers along a surface of the substrate;
removing the first organic solvent and the second organic solvent;
curing the hydrophobic polymer precursor of the coating of the silicate/polymer precursor using ultraviolet radiation to initiate cross-linking of hydroxyl or carboxylic groups of the polymer precursor with the silicate layers; and
annealing the cured coating to form the layered silicate/polymer composite on the substrate, wherein the annealing forms chemical bonds between the silicate layers and the polymer matrix through cross-linking of the hydroxyl or carboxylic groups with the silicate layers.

* * * * *